US009602197B2

(12) United States Patent
Pham et al.

(10) Patent No.: US 9,602,197 B2
(45) Date of Patent: Mar. 21, 2017

(54) NON-INTRUSIVE DIAGNOSTIC PORT FOR INTER-SWITCH AND NODE LINK TESTING

(71) Applicant: Brocade Communications Systems, Inc., San Jose, CA (US)

(72) Inventors: Nhan Trong Pham, Fremont, CA (US); Badrinath Kollu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 184 days.

(21) Appl. No.: 14/554,453

(22) Filed: Nov. 26, 2014

(65) Prior Publication Data

US 2016/0149639 A1    May 26, 2016

(51) Int. Cl.
*H04B 10/07* (2013.01)
*H04B 10/077* (2013.01)

(52) U.S. Cl.
CPC ..... *H04B 10/0775* (2013.01); *H04B 10/0773* (2013.01)

(58) Field of Classification Search
CPC ...... H04J 14/02; H04J 14/0223; H04B 10/00; H04B 10/032; H04B 10/077; H04B 10/07955; H04B 10/07; H04B 10/075

USPC ................................. 398/10, 16, 17
See application file for complete search history.

(56) References Cited

U.S. PATENT DOCUMENTS

| 7,093,172 | B2* | 8/2006 | Fan | H04L 1/241 370/249 |
|---|---|---|---|---|
| 7,127,648 | B2* | 10/2006 | Jiang | H04L 43/50 714/715 |
| 8,798,456 | B2* | 8/2014 | Skirmont | H04B 10/0773 398/10 |
| 2004/0030977 | A1* | 2/2004 | Jiang | H04L 43/50 714/742 |
| 2013/0266307 | A1* | 10/2013 | Garg | H04B 10/0773 398/16 |

* cited by examiner

*Primary Examiner* — Tesfaldet Bocure
(74) *Attorney, Agent, or Firm* — Blank Rome, LLP

(57) ABSTRACT

A diagnostic testing utility is used to perform single link diagnostics tests including an electrical loopback test, an optical loopback test, a link traffic test, and a link distance measurement test. These diagnostics tests can be performed on trunked links and virtual channels and can be performed while QoS is enabled. Additionally the tests can be performed non-intrusively by using a dedicated VC such that regular traffic is not affected by the diagnostics testing.

24 Claims, 8 Drawing Sheets

NON-INTRUSIVE DIAGNOSTIC PORT FOR INTER-SWITCH AND NODE LINK TESTING

TECHNICAL FIELD

The present invention relates to the field of computer networking, and in particular to techniques for performing link level diagnostics in a switch fabric.

BACKGROUND

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices are connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Many SANs rely on the FC protocol. The FC protocol defines standard media and signaling conventions for transporting data in a serial fashion. It also provides an error correcting channel code and a frame structure for transporting the data. Many FC switches provide at least some degree of automatic configurability. For example, they may automatically sense when a new inter-switch link (ISL) becomes active, and may initiate an initialization process to discover what the link connects to. The switch may automatically determine various parameters for the link (e.g. link speed). As FC networks are created, updated, maintained and de-commissioned, switches may be enabled, disabled or reconfigured, and links may be added or removed.

Over time, FC networks have become more complex, with multiple fabrics involving several switches that use inter-switch links (ISLs) connected to switch ports (E_ports) on the switches. As FC networks have become more complex, the network speeds have also increased significantly. As faster networks are implemented, media and cable tolerance become more important for avoiding degraded performance and cyclic redundancy check (CRC) errors. At the same time, as larger networks are developed, diagnostic of optics and cables become more and more time consuming and intrusive. Current switches have two basic types of built-in diagnostics. First, the SFP electro-optical modules have digital diagnostics, but these only operate at the SFP component level. Second, a command line interface (CLI) tool may be provided to allow frames to be injected and circulated on a specific link, but the end result is only a good and bad indication, which does not greatly aid diagnosis. An alternative way of performing diagnostics is to use a network link level diagnostic tool which involves utilizing a dedicated diagnostic port (D_Port). D_Ports are ports that are statically configured by the user for the purpose of running diagnostics. Generally, any FC port can be configured as a D_Port. However, once a port is configured as a D_Port, it will no longer be part of the fabric as it will not carry any inter-switch or data traffic. A D_Port will also not merge fabrics. The D_Port is only used for link diagnostic purposes and to isolate link level faults. The D_Port is only used for link diagnostic purposes and to isolate link level faults.

Some D_Ports have been recently developed that can dynamically enter into diagnostic mode. One such configuration is discussed in U.S. Patent Publication No. 2013/0266307, filed on Mar. 7, 2013 and entitled "Diagnostic Port For Inter-switch And Node Link Testing In Electrical, Optical And Remote Loopback Modes," which is hereby incorporated by reference in its entirety. Though advantageous in certain aspects, such configurations still require that the link be disabled or de-commissioned for the duration of the diagnostics, and as such significantly interferes with regular traffic. Taking a link offline could also result in rerouting of traffic and can cause imbalances in the system.

An alternative way of performing online path diagnostics has been recently developed which involves testing of links between two HBAs or CNAs ports, by saturating one DMA channel between the two ports with diagnostic traffic while regular traffic flows through the other DMA channel. One such configuration is discussed in U.S. Patent Publication No. 2013/0111077, filed on Oct. 31, 2011 and entitled "SAN Fabric Online Path Diagnostics," which is hereby incorporated by reference in its entirety. Though providing the ability to continue running traffic during diagnostics, this method is limited to use between HBAs. Moreover, because the DMA channel used for diagnostics is saturated with diagnostics traffic, regular traffic flows at a reduced rate.

Thus it would be desirable to implement a network diagnostic method to more efficiently troubleshoot larger networks, thereby improving the speed, efficiency, and reliability of these networks.

SUMMARY

In one embodiment, a network link level diagnostic tool is disclosed. The diagnostic tool can monitor and set alerts for digital diagnostics, test both ends of the connectivity to validate that the links are within budget, saturate a link with a representative SAN traffic profile to validate fabric performance, monitor and trend for the integrity of the optics during its operational life cycle, and granularly measures cable distance to determine physical limitation or performance degradation of the link over time. Additionally, the diagnostic tests can be performed on trunked links and virtual links with the option of enabling and testing for QoS. Moreover, a dedicated virtual channel may be used for diagnostic traffic thereby providing the ability to perform diagnostics non-intrusively.

BRIEF DESCRIPTIONS OF THE DRAWINGS

DETAILED DESCRIPTIONS

Figure 1:
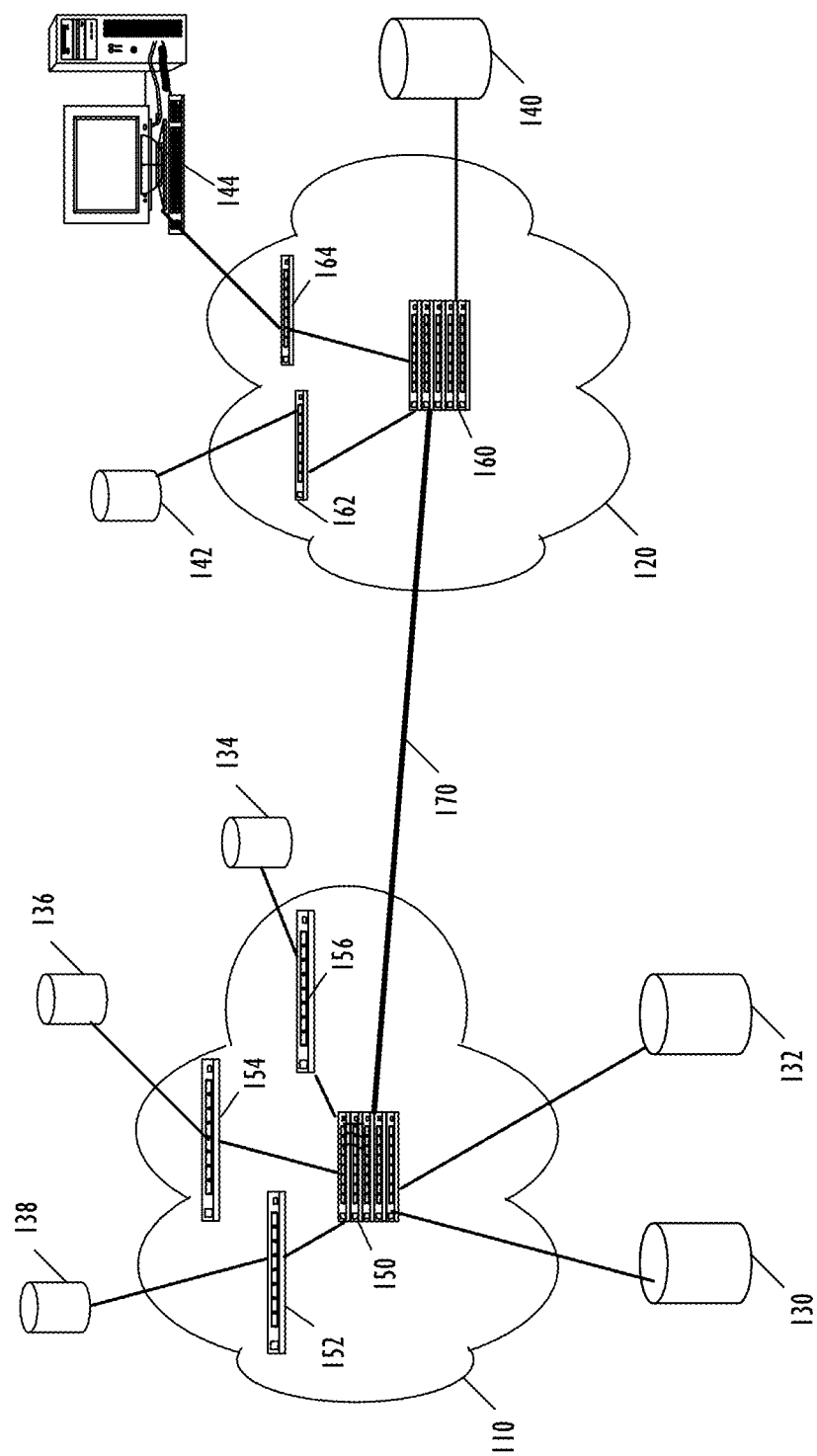
FIG. 1 is a block diagram illustrating an exemplary Fibre Channel network.

An exemplary FC network is illustrated in FIG. 1. As illustrated, the FC network of FIG. 1 includes two FC fabrics, a fabric no and a fabric 120. The fabric 120 includes switches 160, 162, 164 which are coupled to each other via ISLs and are each also connected to either a storage device or a computer system. For example, switch 164 is coupled to the computer system 144 and switch 162 is coupled to a storage device 142. The computer system 144 may be any suitable node device including a desktop computer, a server, or a user terminal. The FC fabric no is shown as having four switches 150, 152, 154 and 156 coupled together via ISLs. These switches are also each coupled to one or more storage devices. Switch 150 is coupled to storage devices 130 and 132, switch 152 is coupled to storage device 138, switch 154 is coupled to storage device 136, and switch 156 is coupled to storage device 134. The switches 150 and 160 each have a router port which is connected to the other router port by link 170. By using router ports instead of typical E_Ports, the fabrics no and 120 stay separate and do not merge into a single fabric.

Each of the storage devices shown in FIG. 1 may be any suitable node device including a JBOD (Just a Bunch of Disks), RAID (Redundant Array of Inexpensive Disks) array, tape library, or network data store. Each of the switches may have as few as two and as many as 256 or more ports.

As illustrated in FIG. 1, FC networks can be complex. As such, diagnosing possible errors or faulty links in these networks can be challenging. To more efficiently troubleshoot large networks and improve the speed, efficiency, and reliability of the networks, D_Ports have been used in the past to diagnose potential problems in inter-switch links. A D_Port is configured to run one or more link level diagnostic tests with minimal user intervention and provide comprehensive test results. The diagnostic tests performed by a D_Port achieve one or more of the following: 1) test both ends of a link's connectivity to validate that the link is within dB budget; 2) saturate a link with a representative SAN traffic profile to validate fabric performance; and 3) monitor and determine trends for the integrity of the optics during its operational life cycle.

In general, two different software modules can be used to perform D_Port diagnostics. The operation and configurability of D_Ports may be handled by the fabric module. The fabric module implements the Fibre Channel Switch Fabric (FCSF) standard. The fabric module follows the FCSF standard for fabric initialization processes, such as determining the E_ports, assigning unique domain IDs to switches, throttling the trunking process, and distributing the domain and alias list to all switches in the fabric. The fabric module can also perform D_Port related operations such as reading small form-factor pluggable (SFP) capabilities and sending out state change notices (SCNs) of the D_Port to notify other modules in the preferred embodiment. The fabric module can perform some of these D_Port related operations through the use of switch drivers. The diagnostic module referred to as the diag module may implement spinfab CLI commands.

One of the advantages of using D_Port diagnostics is that they could be used on various types of ports. For example, D_Port diagnostics may be performed on E_ports connected to ISLs between network switches in the fabric, F_ports connected to links to N_ports on devices, E_ports, F_ports, or N_ports. For clarity, the discussion below is typically written in terms of, diagnostics using E_ports, but similar techniques may be used for diagnostics in F_ports and N_ports. Some of these conditions may only apply to E_ports, while others may only apply to F_ports or N_ports, and others may apply to any port.

Figure 2:
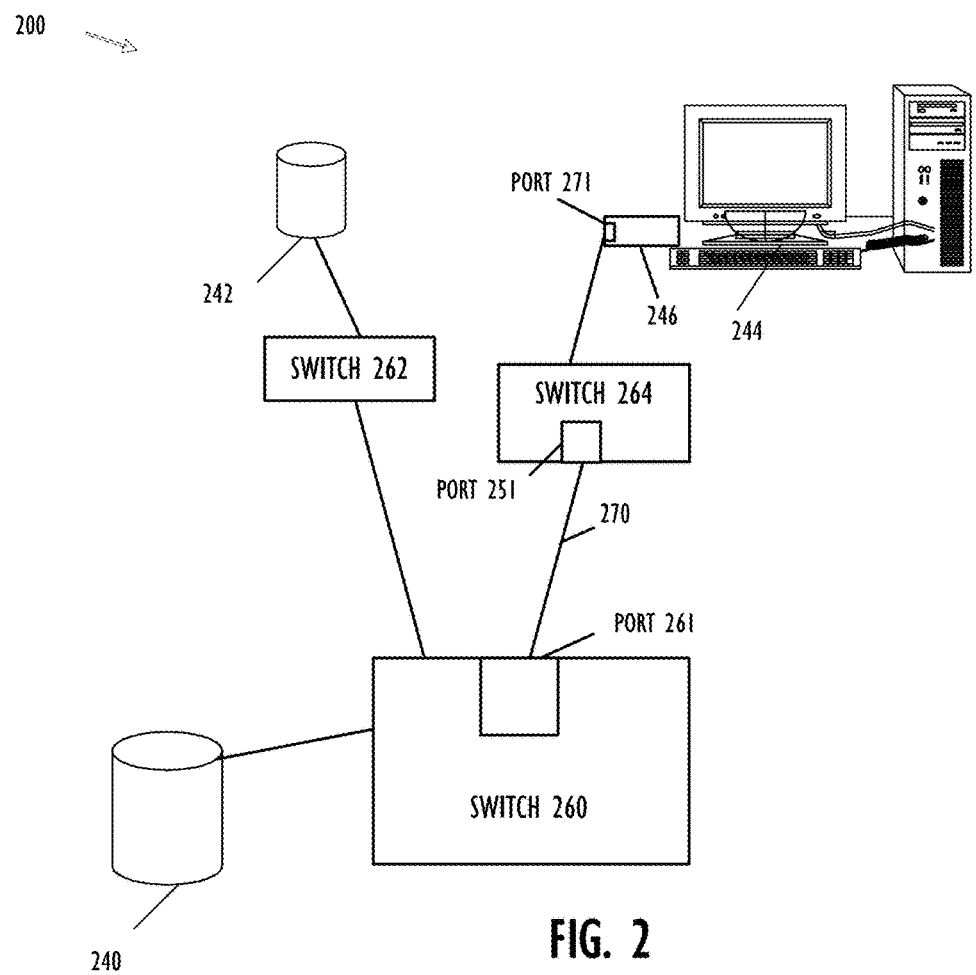
FIG. 2 is a block diagram illustrating an exemplary Fibre Chancel network implementing D_Port diagnostics according to one embodiment.

FIG. 2 is a block diagram illustrating an FC network which implements one embodiment of the use of D_Ports diagnostics. FIG. 2 illustrates switches 260, 262 and 264. Each of these switches is coupled to one or more storage devices or computer systems. For example, switch 264 is coupled to the computer system 244, switch 262 is coupled to the storage device 242, and switch 260 is coupled to the storage device 240. Some of the switches are also coupled to each other through ISLs. For example, switch 260 is coupled through ports 261 and 251 to switch 264.

Although illustrated in FIG. 2 as a single chassis, the switches 260 and 264 may comprise a plurality of network switches in one or more chassis. In the network 200, hosts and devices are connected into a SAN using the switches. It should be noted that the numbers of storage devices and switches are illustrative and by way of example only, and any desired number of storage devices and switches may be connected in the network 200.

As can be seen in FIG. 2, the connections between the switches create inter-switch links. As such, switches 264 and 260 are coupled to each other through the inter-switch link 270. Each of the inter-switch links can be diagnosed using D_Port diagnostics. For example, the inter-switch link 270 can be diagnosed to detect potential faults and validate inter-switch connectivity.

Figure 3:
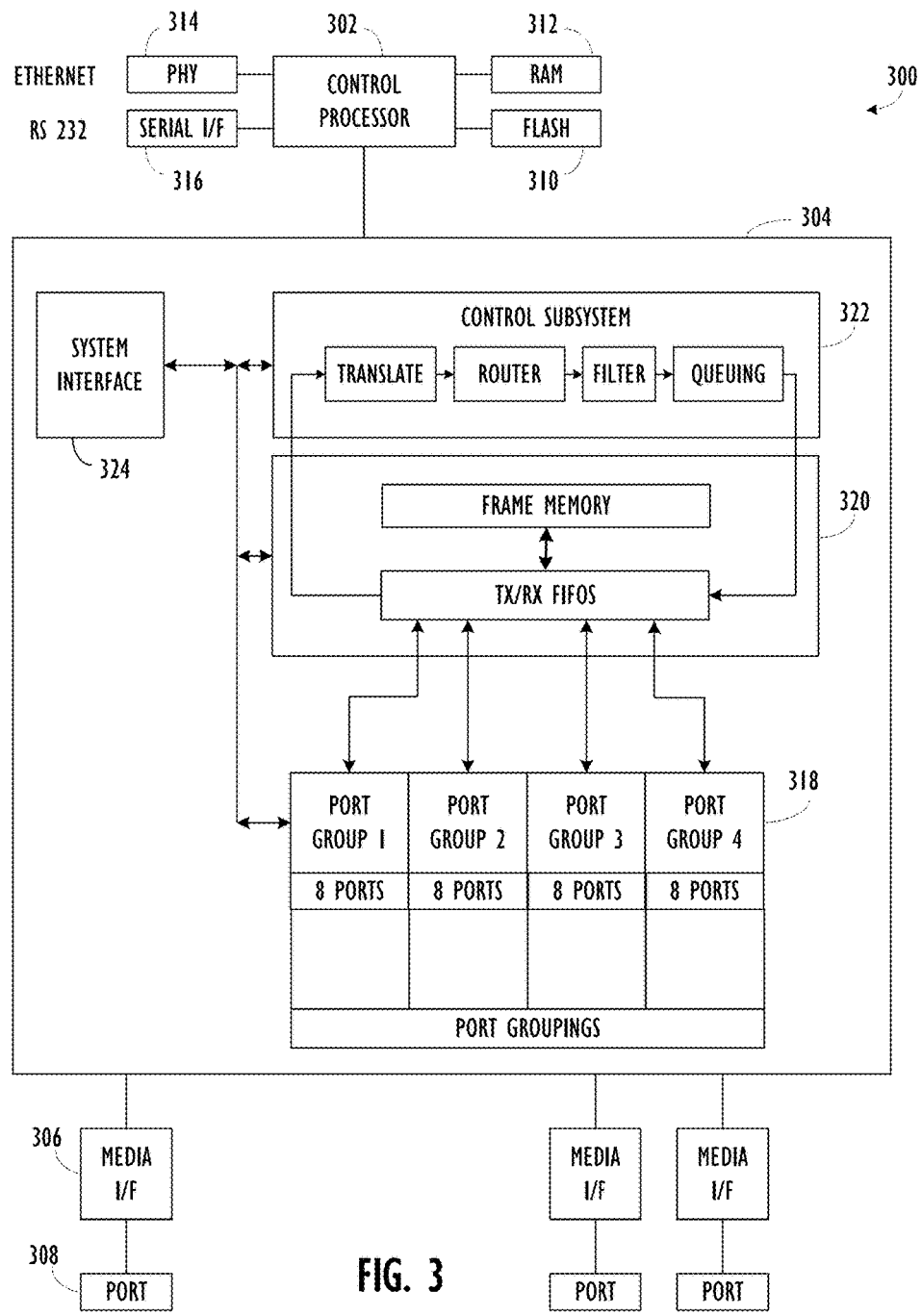
FIG. 3 is a block diagram of an exemplary switch.

FIG. 3 illustrates a block diagram of a FC switch 300 that may be utilized in accordance the preferred embodiment of the present invention. A control processor 302 is connected to a switch ASIC 304. The switch ASIC 304 is connected to media interfaces 306 which are connected to ports 308. Generally the control processor 302 configures the switch ASIC 304 and handles higher level switch operations, such as the name server, the redirection requests, and the like. The switch ASIC 304 handles the general high speed inline or in-band operations, such as switching, routing and frame translation. The control processor 302 is connected to flash memory 310 to hold the software, to RAM 312 for working memory and to an Ethernet PHY 314 used for management connection and serial interface 316 for out-of-band management.

The switch ASIC 304 has four basic modules, port groups 318, a frame data storage system 320, a control subsystem 322 and a system interface 324. The port groups 318 each contain eight ports and perform the lowest level of packet transmission and reception. Generally, frames are received from the media interface 306 and provided to the frame data storage system 320. Further, frames are received from the frame data storage system 320 and provided to the media interface 306 for transmission out a port 308.

In one embodiment, the processor 302 runs the modules used in performing the diagnostics tests of the present invention. Ports in the port groups 318 are each connected to a media interface module 306, conventionally an SFP, which receives the particular Fibre Channel medium used to interconnect switches used to form a fabric or to connect to various devices. SFPs according to the present invention include optical loopback capabilities to allow incoming frames to be looped back out within the SFP itself, rather than requiring a receiving ASIC to perform the looping within the necessary electro-optical conversions. Further, SFPs according to the present invention include internal electrical loopback capabilities to allow near end testing. The processor 202 uses the fabric module to communicate with the SFPs to set both electrical and optical loopback modes for diagnostic testing. For example, the processor may be adapted to provide a diagnostic frame that indicates diagnostic mode and optical loopback to a network port and to receive through the network port a diagnostic accept frame indicating diagnostic mode and optical loopback. After receiving the accept frame, the processor may provide diagnostic frames to the network port to perform diagnostics. More details regarding D_Port diagnostics can be found in U.S. Pat. No. 8,798,456, titled "Diagnostic Port For Inter-Switch Link Testing In Electrical, Optical And Remote Loopback Modes," and in United States Published Application No. 2013/0266307, titled "Diagnostic Port For Inter-Switch And Node Link Testing In Electrical, Optical And Remote Loopback Modes," the entirety of both of which is in incorporated herein.

While the present embodiment discusses communication networks using the Ethernet and FC protocols, with switches, routers and the like, the present invention can be applied to any type of data communication network.

Though providing a lot of advantages over prior methods of performing diagnostics, D_Port diagnostics as used in prior systems have certain shortcomings. For example, because the link on which D_Port diagnostics is performed is disabled for the duration of the diagnostics, the process interferes with regular traffic and could result in rerouting of traffic and imbalances in the system. This and other shortcomings are addressed by the improved D_Port diagnostics system and method disclosed herein.

An improved D_Port diagnostics can, for example, test certain Fibre Channel features and links that could not be tested previously. One of the new improvements is the ability to test trunked links. Link trunking is well known in the art as illustrated in U.S. Pat. No. 7,447,198, entitled, "Link Trunking and Measuring Link Latency in Fibre Channel Fabric," issued Nov. 4,2008, which is hereby incorporated by reference.

Figure 4:
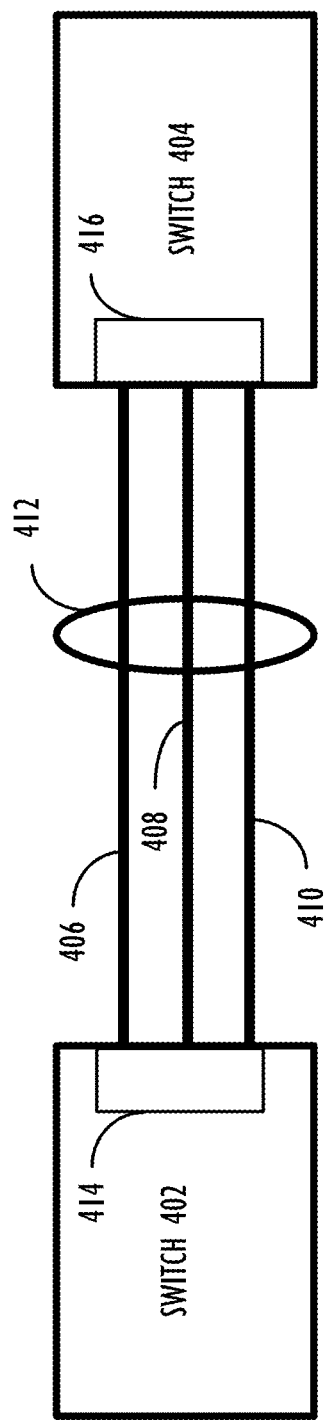
FIG. 4 is a block diagram of exemplary switches that are connected by trunked links, according to one embodiment.

Performing diagnostics on a trunked link is illustrated in FIG. 4, where switch 402 is shown connected to switch 404 through the trunked links 412. The trunked links include a link 406, link 408 and link 410 and connect a port 414 of switch 202 to a port 416 of the switch 404. In one embodiment, ports 414 and 416 are configured as D_Ports to initiate D_Port diagnostics on the trunked links 412. For purposes of D_Port diagnostics, one of the links may be treated as a D_Port master link, while the other ports are treated as D_Port slave links. For example, in one embodiment, link 406 is treated as the D_Port master link, while the links 408 and 410 are treated as D_Port slave links. In this manner, the improved D_Port diagnostics system and method can provide D_Port diagnostics on trunked links.

In one embodiment, to perform diagnostics on trunked links, the D_Port protocol may execute and run an electrical loop back test. The D_Port may then join the trunk as is normally done with the trunking protocol. After detecting that it is a part of a trunk group, in one embodiment, the entire D_Port trunk group may start optical loopback tests on the entire trunk. Next, the D_Port trunk group may run link traffic tests on the entire trunk. In one embodiment, the D_Port group may also perform CS_CTL based frame prioritization and VC testing based on the user's configuration of the D_Port trunk. After all the tests are complete, the D_Port trunk group may provide the results to be displayed to a user.

In addition to providing D_Port diagnostics on trunk links, an improved D_Port diagnostics method may also provide the ability to perform diagnostics on virtual channels (VCs). Use of virtual channels in Fibre channel networks is well known in the art, as illustrated by U.S. Pat. No. 7,656,898, issued Feb. 2, 2010, and entitled "Virtual Channel Remapping," which is incorporated herein by reference.

Figure 5:
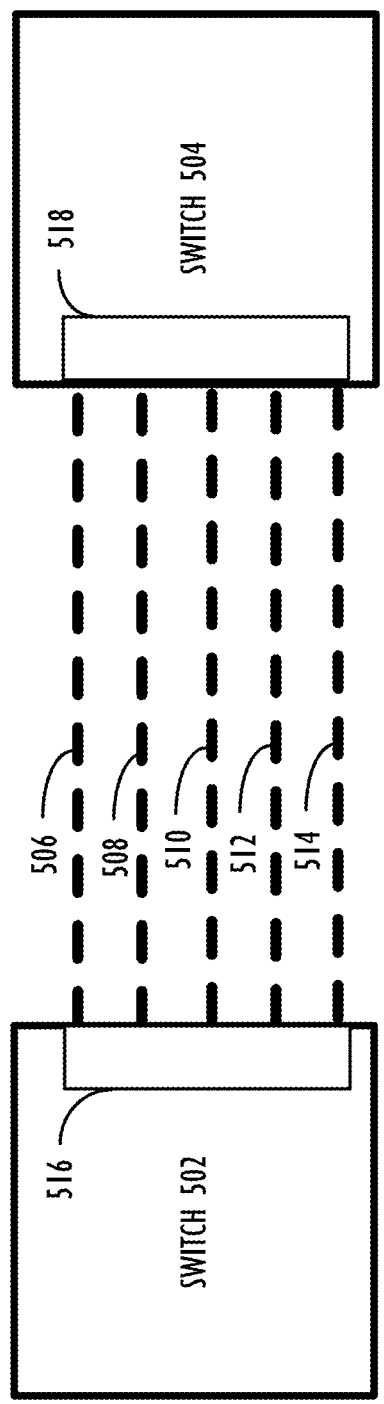
FIG. 5 is a block diagram of exemplary switches that are connected by virtual channels, according to one embodiment.

Performing diagnostics on virtual channels is illustrated in FIG. 5, where switch 502 is connected to switch 504 through multiple VCs. The VCs include VC 506, 508, 510, 512 and 514 and they all connect a port 516 on switch 502 to a port 518 on switch 504. In one embodiment, D_Port diagnostics can run traffic tests on each particular VC, as for example, specified by a user, or can run the diagnostics tests on all VCs available on the ports. As described before, this requires, in one embodiment, that both ports 516 and 518 be configured as D_Ports before the diagnostics tests can be run. In one embodiment, a user can define which ports and which VCs to run the diagnostic tests on. In this manner, in addition to providing the ability to test ISLs, D_Port diagnostics can be used to perform diagnostics on one or more virtual channels in a network.

Additionally, the improved D_Port diagnostics system and method provides the functionality in one embodiment, to perform D_Port diagnostics while Quality of Service (QoS) is enabled. This is done, in one embodiment, by utilizing a CS_CTL-based frame prioritization feature that allows prioritization of frames being transferred between two devices as having high, medium, or low priority, depending on the value of the CS_CTL field in the FC frame header. High, medium, and low priority frames are allocated to different virtual channels (VCs). Thus, by changing the CS_CTL field in the Fibre Channel frame header of test frames that are sent during diagnostics, a VC can also be tested for its QoS. For example, low priority frames can be sent on one of the virtual channels while medium priority frames are sent on one or more other channels. Performance of the two types of VCs can be compared after the frames are received at the other end to confirm the QoS. Thus, assuming that VCs 506 and 508 are considered low VCs, while VCs 510 and 512 are labeled medium VCs and VC 514 as high quality, the improved D_Port diagnostics system and method provides the ability to run tests on the low priority VCs 506 and 508, medium priority VCs 510 and 512, and high priority VC 514 and compare the results to confirm the allocated priorities perform accordingly.

Figure 6:
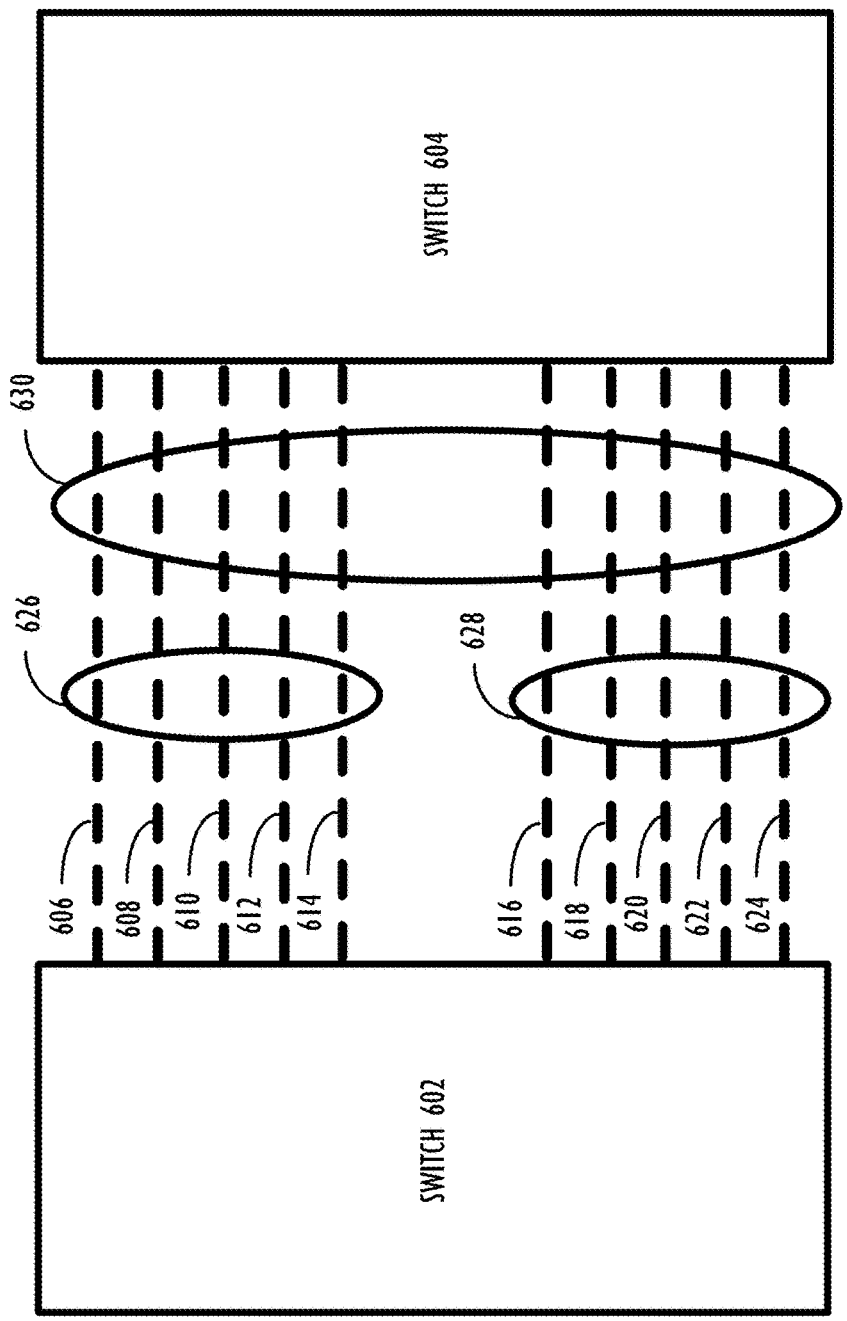
FIG. 6 is a block diagram of exemplary switches that are connected by virtual channels comprising of trunked links, according to one embodiment.

In one embodiment, the ability to perform diagnostics on trunked links can be combined with the ability to perform diagnostics with QoS enabled, such that D_Port trunked links can be formed with QoS enabled and have traffic run on low, medium, and high VCs in D_Port trunk groups. This is illustrated in FIG. 6, where two sets of virtual channels are trunked as links. In such a case, one set of the virtual channels can be configured as the D_Port master link and the other set can be configured as the D_Port slave link. For example, the set of virtual channels in FIG. 6 which include VCs 606-614 can be grouped together and treated as a master trunk link 626, while the group of VCs 616-624 can be grouped together and treated as a slave trunk link 628. The two groups together are treated as a trunk group 630. As such, D_Port diagnostics can be performed on the all the VCs in the trunk by utilizing features used for diagnostics of trunked links, at the same time as QoS is enabled. Test of QoS capabilities can be done as discussed before by utilizing the CS CTL field in the Fibre Channel frame header of test frames that are sent during diagnostics.

Figure 7:
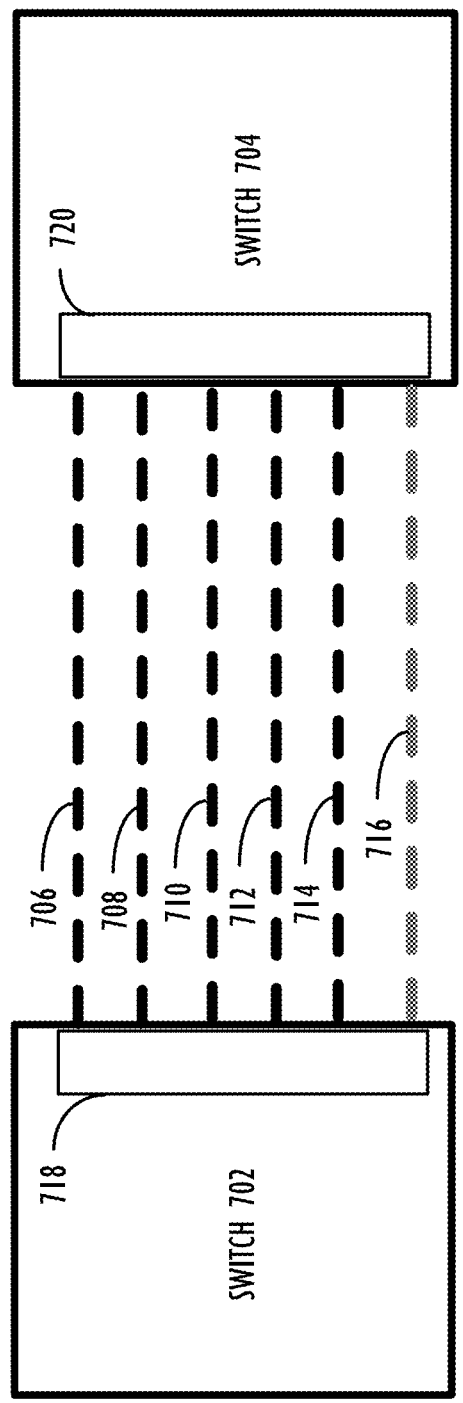
FIG. 7 is a block diagram of exemplary switches that are connected by virtual channels and have a dedicated diagnostics virtual channel, according to one embodiment.

In addition to providing the ability to perform diagnostics on virtual channels and trunked links, in one embodiment, the improved D_Port diagnostics system and method provides the functionality to run the diagnostic tests on a dedicated VC, while the other VCs between the ports run normal traffic. This is highly advantageous because the entire link does not have to be disabled to perform D_Port diagnostics. This may be particularly useful in situations where taking a link offline is not an option due to rerouting and imbalances it can cause. Moreover, taking a link offline may require a maintenance window. Moreover, by using a dedicated VC, the system can ensure that diagnostics traffic does not unduly interfere with production traffic. For example, the diagnostics traffic may only use the idle bandwidth on a link. Because the diagnostics traffic is run on the idle bandwidth, the improved method, in one embodiment, provides the option to saturate ISLs or links to end devices on a periodic basis to determine the integrity of SFPs or cables. This is illustrated in FIG. 7.

As shown two switches 702 and 704 are connected to each other through VCs coupling a port 718 of switch 702 to a port 720 of switch 704. The VCs include VCs 706-716. In one embodiment, the VCs 706-714 run normal traffic, while VC 716 is dedicated as a diagnostics VC. For example, VCs 706 and 708 may be dedicated as low priority VCs, VCs 710 and 712 as medium priority, and VC 714 as high priority, while VC 176 is dedicated as the diagnostic VC. In one embodiment, the diagnostic VC 716 does not carry normal traffic and is only used for performing diagnostics. In other embodiments, the bandwidth dedicated to the diagnostic VC 716 is made available to other VCs when diagnostic tests are not being performed. This ensures efficiency and provides a method of performing diagnostic tests non-intrusively.

In one embodiment, the dedicated diagnostic VC 716 receives only a minimal bandwidth and credit. For example, in one embodiment, the diagnostic VC has 1 to 2% of the link throughput in case a user accidentally starts diagnostics traffic on a link saturated with production traffic. The credit allocated to a diagnostics VC is borrowable by other VCs, in one embodiment, such that when it is not being used by diagnostics VCs, the credit can be used for production traffic. In this manner, unnecessary resources are not tied up when they could be available for production traffic. In one embodiment, a maximum borrowable amount of credit per link is made available for diagnostics. The maximum number is selected such that it is sufficient for generating link rate traffic, and is able to saturate the link. This maximum number is three credits in one embodiment. For trunked links, the maximum borrowable number may be used to allocate the same number of borrowable VC credits per link. This is because VC credits maybe borrowed during run time of traffic. In general, there is a shared pool of credits pre-allocated in the switch, and the D-Port may tap into that pool when needed to do its own traffic tests and not disrupt live traffic by using a dedicated VC.

In one embodiment, the allocation of the diagnostics VC happens during link initialization, such that from the beginning a dedicated diagnostics VC exists for each link. Alternatively, a new or old VC can be allocated as a diagnostics VC after link initialization. In one embodiment, the allocated diagnostics VC stays online as long as the link is online. In general, the allocated diagnostics VC does not interfere with any production traffic. In one embodiment, the allocated diagnostics VC utilizes unused bandwidth on the link to ensure the link is saturated while diagnostics is being performed.

Figure 8:
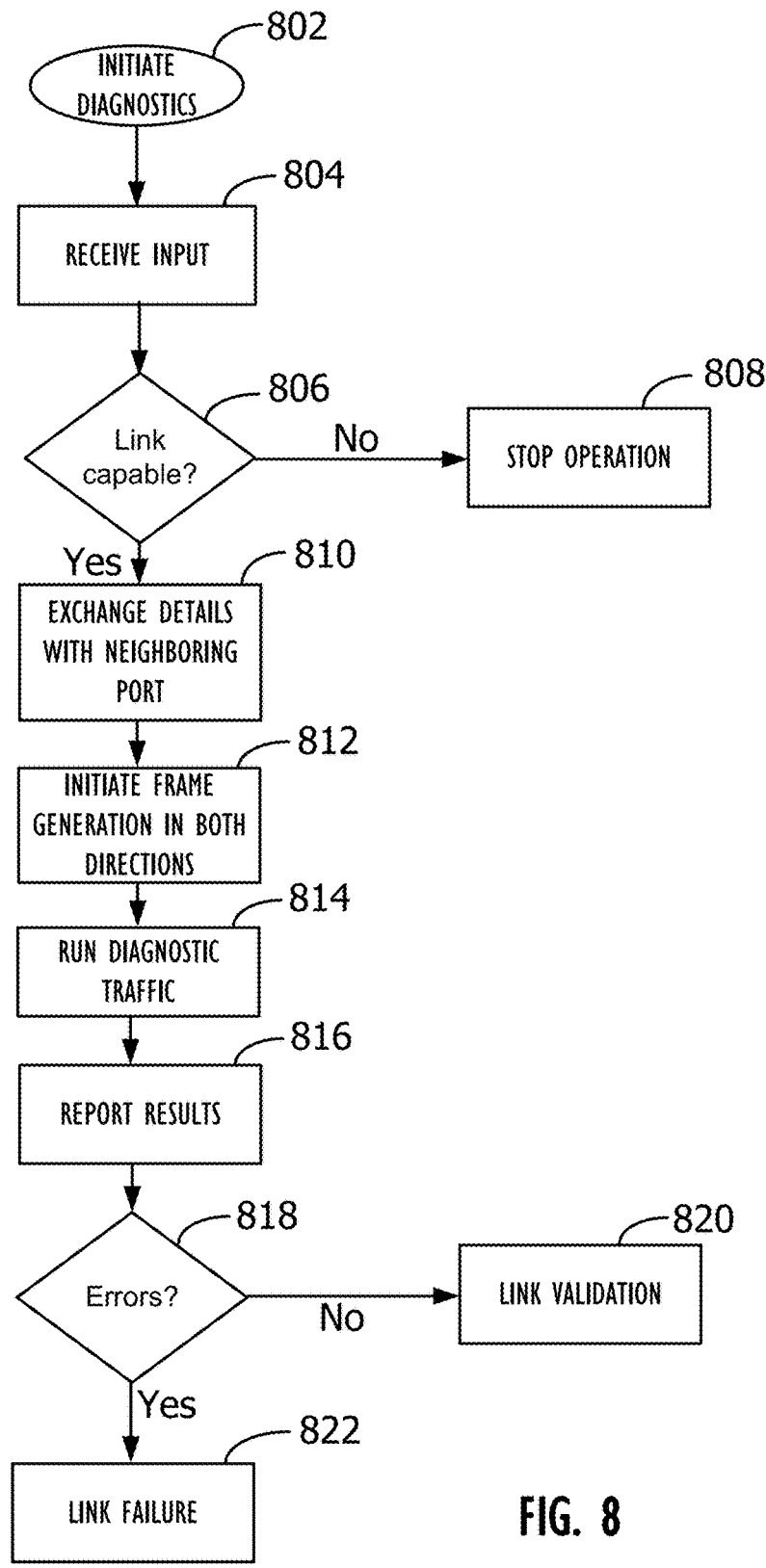
FIG. 8 is a flowchart illustrating a method for performing non-intrusive diagnostics, according to one embodiment.

FIG. 8 illustrates one embodiment of a method to perform diagnostics using a dedicated VC. The method 800 begins, in one embodiment, by initiating diagnostics at step 802. This is done, in one embodiment, by a user requesting diagnostics. Alternatively, it could be set up so it is done automatically. For example, the network may be set up for periodic diagnostics of one or more links. After diagnostics has been initiated, one or more inputs relating to the diagnostic tests that need to be performed may be received at step 804. For example, when a user initiates diagnostics, the user may identify the ports on which diagnostics should be performed, the frame size to use for running diagnostics traffic, the rate, and the like. If diagnostics is being performed automatically, these inputs may have already been provided and may be retrieved at this stage. The system then determines if the link is capable of performing diagnostics at step 806. This may, for example, determine if there is any bandwidth available on the link for performing diagnostics. When the link is identified as not being cable of running diagnostics, the operation is stopped on that link at step 808. However, when the link is capable of performing the diagnostics, the process is started at step 810 by exchanging details between the two ports at each of the link so that the links are ready for diagnostics.

Once the ports are ready, diagnostics frame generation is initiated at each switch or device at both ends of the link at step 812. This is done, in one embodiment, by the switch. The switch has the ability to generate traffic at the line rate with a random data pattern or a data pattern set by user. Moreover, the switch can assign values to the FC header which may be needed during CS_CTL priority tests. Traffic can be controlled by preconfiguring the traffic pattern, payload size and FC header. After generating the traffic, diagnostics traffic is run on a dedicated VC between the two ports at step 814 to perform diagnostics. Once traffic has reached the other end and the diagnostic tests have been performed, the results may be reported at step 816. Alternatively, if the system is automatically performing diagnostics, the results may be stored for later viewing. Method 800 then determines, in one embodiment, if the results indicate the presence of one or more errors on the link at step 818. In one embodiment, statistics on the link are recorded prior to the test and the newly obtained results are compared to the statistics to identify errors. If errors are identified, the link is validated at step 820. Otherwise, link validation fails and the link is identified as a failed link at step 822.

In one embodiment, the method 800 can be initiated by a user (e.g. a network administrator) through an application accessed on an administrative workstation such as the computer system 244 of FIG. 2. The application may include one or more user interfaces or GUIs (not shown) that enable the user to identify the ISL intended to be diagnosed and turn on a diagnostic mode. Turning on the diagnostic mode may start running the method 800 automatically on the identified ISL. In other embodiments, the user may initiate each step of the method 800. In one embodiment, the user is able to decide which diagnostic tests to run on the ISL. After the diagnostic tests have been performed, the result may be presented to the user for analysis.

The application may be provided on any desired non-volatile computer-readable program storage media including, but not limited to, all forms of optical and magnetic, including solid-state, storage elements, including removable media. The application workstation 244 may be any desired type of computational device, including a virtualized computer executing on any real hardware platform desired.

In addition to using the application, D_Port diagnostics may use a command line interface (CLI) implemented on one of the switches to allow the user to initiate the diagnosis. In such an embodiment, the diagnosis can be initiated using a port identifier as a parameter to the diagnostic command. The process may include querying the switches in the network for the list of ports and then sending D_Port diagnostic requests for the selected ports. The diagnostic command may block waiting for completion of the diagnostic request. The command may also result in a message indicating successful or unsuccessful completion of the diagnostic tests and/or displaying the test results.

The diagnostics tests initiated may include one or more of the following tests: 1) electrical loopback test; 2) optical loopback test; 3) link traffic test, and 4) QoS testing. Specific commands may be used to perform these tests. In one embodiment, a test initiator port initiates the diagnostic tests, while a port at the other end of the link, referred to as the test responder responds. In one embodiment, the ports are designated as an initiator or responder based on a pre-determined characteristic of the ports such as their World Wide Name (WWN). For example, the port having a higher WWN may be designated as the initiator, while the port having a lower WWN may get designated as the responder. In another embodiment the initiator status is set by user command, allowing either port to be an initiator. In one embodiment, MAPS policies are temporarily disabled during diagnostics testing. Alternatively, the user may have the option of enabling the policies during the diagnostics. The diagnostics tests can be performed for internal links.

Accordingly, the D_Port diagnostic tests can be utilized to perform link level sanity tests in Fibre Channel networks. These diagnostics tests can be performed on trunked links and virtual channels and can be performed while QoS is enabled. Additionally the tests can be performed non-intrusively by using a dedicated VC such that regular traffic is not affected by the diagnostics testing. In this manner, the improved D_Port diagnostic tests significantly improve testing capabilities for detecting single link faults.

Although described above generally in terms of FC fabrics and using FC terminology, the problems and techniques for graceful decommissioning of ports are not limited to FC fabrics and protocols, but may be implemented using similar techniques to those described above in Ethernet and other types of networks, including lossless networks using IEEE Data Center Bridging.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A device comprising:
   a processor; and
   a network port coupled to the processor, the network port connected by at least two virtual channels to a second network port;
   wherein the processor is adapted to provide a diagnostic frame indicating diagnostic mode and optical loopback to the network port and the network port is configured to transmit the diagnostic frame to the second network port through a first virtual channel of the at least two virtual channels and to receive through the first virtual channel a diagnostic accept frame indicating diagnostic mode and optical loopback;
   wherein the processor is adapted to provide frames to the network port for transmission through the first virtual channel, upon receiving the diagnostic accept frame to perform diagnostics; and
   wherein normal traffic flows through the second virtual channel of the at least two virtual channels while the frames are being transmitted through the first virtual channel.

2. The device of claim 1, wherein the first virtual channel is dedicated to performing diagnostics.

3. The device of claim 2, wherein a bandwidth dedicated to the first virtual channel is made available to remaining virtual channels of the at least two virtual channels when diagnostics are not being performed.

4. The device of claim 1, wherein the first virtual channel is selected for performing diagnostics by a user.

5. The device of claim 1, wherein the frames only use an idle bandwidth of a link between the network port and the second network port.

6. The device of claim 1, wherein quality of service (QoS) is enabled while diagnostics is being performed.

7. The device of claim 6, wherein performing diagnostics comprises testing the QoS.

8. The device of claim 1, wherein diagnostics are performed on trunked links.

9. The device of claim 1, wherein the device is a switch.

10. A network comprising:
    a first device including a first processor and a first network port coupled to the first processor;
    a second device including a second processor and a second network port coupled to the second processor; and
    at least two virtual channels connecting the first network port to the second network port;
    wherein the first processor is adapted to provide a diagnostic frame indicating diagnostic mode and optical loopback to the first network port and the first network port is configured to transmit the diagnostic frame to the second network port through a first virtual channel of the at least two virtual channels;
    wherein the second processor is adopted to receive the diagnostic frame and in response return a diagnostic accept frame indicating diagnostic mode and optical loopback;
    wherein the first processor is adapted to receive the diagnostic accept frame and in response provide frames to the first network port for transmission through the first virtual channel to perform diagnostics; and
    wherein normal traffic flows through the second virtual channel of the at least two virtual channels between the first network port and the second network port while diagnostic the frames are being transmitted through the first virtual channel.

11. The network of claim 10, wherein the first and second devices are switches.

12. The network of claim 10, wherein the first virtual channel is dedicated to performing diagnostics.

13. The network of claim 12, wherein a bandwidth dedicated to the first virtual channel is made available to remaining virtual channels of the at least two virtual channels when diagnostics are not being performed.

14. The network of claim 10, wherein the frames only uses an idle bandwidth between the first network port and the second network port.

15. The network of claim 10, wherein quality of service (QoS) is enabled while diagnostics is being performed.

16. The network of claim 15, wherein performing diagnostics comprises testing the QoS.

17. The network of claim 10, wherein diagnostics are performed on trunked links.

18. A method comprising:
providing by a first processor a diagnostic frame indicating diagnostic mode and optical loopback to a first virtual channel connecting a first network port and a second network port;
transmitting the diagnostic frame to the second network port through the first virtual channel;
receiving by a second processor coupled to the second network port the diagnostic frame and in response returning a diagnostic accept frame indicating diagnostic mode and optical loopback; wherein the diagnostic accept frame is returned through the first virtual channel;
receiving the diagnostic accept frame by the first processor and in response provide frames to the first network port for transmission through the first virtual channel to perform diagnostics; and
wherein normal traffic flows through one or more other virtual channels between the first network port and the second network port while the frames are being transmitted through the first virtual channel.

19. The method of claim 18, wherein the first virtual channel is dedicated to performing diagnostics.

20. The method of claim 19, wherein a bandwidth dedicated to the first virtual channel is made available to the one or more virtual channels when diagnostics are not being performed.

21. The method of claim 18, wherein the frames only uses an idle bandwidth between the first network port and the second network port.

22. The method of claim 18, wherein quality of service (QoS) is enabled while diagnostics is being performed.

23. The method of claim 22, wherein performing diagnostics comprises testing the QoS.

24. The method of claim 18, further comprising performing diagnostics on trunked links.

* * * * *